United States Patent Office 3,418,374
Patented Dec. 24, 1968

3,418,374
FATTY POLYAMINES AND THEIR ALKYL AND ALKOXY DERIVATIVES
Eugene J. Miller, Jr., Wheaton, Ago Mais, La Grange Park, Donald J. Berenschot, Chicago, and Robert L. Berger, Elmhurst, Ill., assignors to Armour and Company, Chicago, Ill., a corporation of Delaware
No Drawing. Filed Nov. 9, 1964, Ser. No. 410,014
4 Claims. (Cl. 260—583)

ABSTRACT OF THE DISCLOSURE

Fatty polyamines and derivatives are prepared by hydrogenating the cyanonitrile precursor with $H_2$ and Raney Ni, and then, if desired, alkylating or alkoxylating the fatty polyamine that is formed.

---

This invention relates to novel derivatives of fatty acid and more particularly to a novel class of fatty polyamines which are useful in their own right as novel surfactants and for the synthesis of other difunctional derivatives of fatty acids.

It has long been the desire of chemists to synthesize or to extract from natural substances compounds which not only possess the desirable physical and chemical properties of the long chain fatty acids, but also contain two or more reactive groups therein. With two or more reactive groups, the fatty compound would not only have good hydrophobic characteristics, but also have high potency, depending upon its reactive group type for surfactant, for polymeric or for other chemical activities.

Among the approaches made toward accomplishing such an objective, that disclosed in U.S. 2,813,113 is typical. There the oxidation of oleic acid

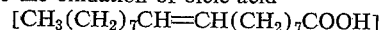
[$CH_3(CH_2)_7CH{=}CH(CH_2)_7COOH$]

to azelaic acid [$HOOC(CH_2)_7COOH$] is discussed. Unfortunately, chain cleavage occurs in such oxidation. This is undesirable because it is detrimental to the hydrophobic nature of the resultant compound.

Roe and Swern of the U.S. Department of Agriculture, in the Journal of the American Oil Chemists Society periodical, volume 37, pages 661 to 668 (1960), report that unsaturated fatty acids may be carboxylated with carbon monoxide. The monoxide adds to the double bond. Such a reaction would conserve the hydrophobic nature of the fatty acid, but apparently no further work was done toward discovering new difunctional fatty compounds. This is unfortunate because, as discussed below, it has been found that such difunctional compounds may be synthesized rather easily and they possess many attributes highly desirable for various chemical technologies.

Accordingly, an object of this invention is to provide novel difunctional fatty compounds which are useful in various chemical technologies.

Another object is to provide a novel class of fatty polyamines.

Still another object is to provide novel methods for the manufacture of such polyamines.

A further object is to provide a novel class of compounds which are good surfactants.

A still further object is to provide a novel class of compounds which are excellent intermediates for other difunctional fatty compounds having valuable properties for various chemical technologies.

Other objects of the invention will in part be obvious and will in part appear hereinafter.

It has now been found that a novel class of fatty polyamines may be prepared by hydrogenating the cyanonitrile precursor of the polyamine using a hydrogenation catalyst such as Raney nickel. The product may then, if desired, be alkylated to form the secondary or tertiary amine or it may be alkoxylated with alkylene oxide to form alkoxylated derivatives of said polyamines. For example, by reacting cyanostearonitrile with hydrogen in the presence of Raney nickel, aminomethylstearylamine is obtained. This compound may then be alkylated with formaldehyde in the presence of Raney nickel and hydrogen to form N,N,N',N'-tetramethylaminomethylstearylamine, or else alkoxylated with ethylene oxide in the presence of a base to form ethyoxylated aminomethylstearylamine.

The invention accordingly comprises the several steps and the relation of one or more of such steps with respect to each of the others, and the compound possessing the features, properties, and the relation of elements, which are exemplified in the following detailed disclosure, and the scope of the invention will be indicated in the claims.

Example I.—Hydrogenation of cyanostearonitrile

A stirred, high pressure reaction vessel is charged with cyanostearonitrile and Raney nickel catalyst (10.65% by wt., wet). The unit is secured and the contents are vacuum dried at 80–83° C. and 23 mm. of Hg pressure for 90 minutes. Vacuum is broken by introducing ammonia gas and the unit is cooled to 52° C. The contents are then purged twice wtih ammonia gas. At 43° C. a 230 p.s.i. ammonia pressure is introduced. The unit is then preheated to 110° C. and hydrogen gas is introduced. When the total pressure inside the reactor reaches 1850 p.s.i., uptake of hydrogen starts. Within five minutes, the temperature will rise to 140° C. and pressure will drop to 1000 p.s.i. During the next 25 minutes, the temperature is raised to 165° C. and pressure is increased to 1700 p.s.i. At this point, the uptake of hydrogen amounts to 72.5% of the theoretical. The reaction proceeds for an additional 60 minutes at 165° C. and 2000–2100 p.s.i. pressure before the theoretical amount of hydrogen gas is consumed. Sampling and analysis of the product exhibits a neutralization equivalent of 166.0 (calc. 149.25). The reaction is allowed to proceed for five hours at 165° C. and 2000 p.s.i. pressure. No further change should occur in the neutralization equivalent. A 99.5% of crude product should be obtained. It is aminomethylstearylamine.

Table I.—Physical and chemical properties

| | Percent |
|---|---|
| Solubility data (weight to weight basis) at 25° C.: | |
| Isopropanol | 10 |
| Benzene | 10 |
| Iso-octane | 10 |
| Kerosene | 10 |
| Skellysolve F | 10 |
| Mineral oil | 10 |
| Water | Insoluble |
| Physical properties: | |
| Theor. mol. wt. | 298.5 |
| $n_D^{20}$ | 1.4685 |
| N.E. | 156.5 |
| I.V. | 1.80 |
| Percent PA | 95.4 |
| SA, meq./g. | 0.06 |
| Color and appearances—Gardner 1; liquid. | |
| Relative density, $d_{25}$ | 0.859 |
| Viscosity, c.p.s. at 25° C. | 21.31 |
| Surface tension, dynes/cm.$^2$ (25° C.) | 32.04 |
| Gas chromatography: | |
| C–19 diamine percent | 82.2 |
| C–17 diamine do | 10.7 |
| C–15 diamine do | 2.7 |

Example II.—Hydorgenation of N,N'-di-(β-cyanoethyl) aminomethylstearylamine

A 300 ml. stirred stainless steel autoclave is charged with 100 gms. of N,N'-di-(β-cyanoethyl)aminomethylstearylamine (0.247 mole) and 10.0 gms. of Raney nickel catalyst (alcohol washed, 10% by wt.). The unit is secured and after it is flushed three times with gaseous ammonia a 250 p.s.i. ammonia pressure is introduced. Pressure is brought up to 1200 p.s.i. with hydrogen gas and heating is started. Temperature is brought up to 165° C. and pressure is maintained at 2000 p.s.i. for four hours. The unit is cooled, vented and opened. The product is removed from the autoclave as a methanol solution. Catlayst is filtered off and the methanol is removed in vacuo. A 100.5 gms. yield of a light oil is obtained (a 98.5% yield).

*Analysis:*

Neutr. equiv. (calc. 103.1) _____102.0
Primary amine _____percent__ 50.4
Secondary amine _____do____ 46.4
Tertiary amine _____do____ 2.06

Example III.—Alkylation of aminomethylstearylamine

After formation of aminomethylstearylamine, it is distilled and 78 gms. (0.26 mole) is charged to a 300 ml. stainless steel stirred autoclave along with 0.78 gms. glacial acetic acid and 1.6 gms. of alcohol washed Raney nickel catalyst. The reactor is sealed, and the temperature raised to 115–120° C., and hydrogen introduced to a pressure of 175 p.s.i.g. Formaldehyde (such as Formcel) 50.2 gms. of the 55% soln., (27.6 gms., 0.92 mole) is pumped in at 115–130° C. over a period of one hour and forty-five minutes with total venting every 12.5 mins. to remove water. The reaction is continued at 120–125° C./175 p.s.i.g. $H_2$ for an additional forty-five minutes. Then the reaction mixture is cooled, vented and filtered to remove the catalyst. Excess water is stripped off in vacuo to yield approximately 99.6 gms. of crude product containing 78% tertiary amine. Distillation at 140–178° C./0.1–0.12 mm. affords a 62.5% yield of N,N,N',N'-tetramethylaminomethylstearylamine of 95.5% tertiary amine content.

Example IV.—Alkoxylation of aminomethylstearylamine (bis-(2-hydroxyethyl)aminomethylstearylamine))

A one-liter Parr autoclave is charged with the aminomethylstearylamine (526 gms., 1.68 moles) of Example I. The temperature is raised to 120° C. and ethylene oxide (155 ml., 137.5 gms, 3.15 moles) is added slowly with stirring. The temperature is maintained at 120–150° C./50 p.s.i.g. during the addition and for one hour after the addition is complete. Then the reaction mixture is cooled. The product is isolated from the mixture as a thick, viscous liquid.

*Analysis:*

Neutralization equiv. _____ 201
Primary amine _____meq./g__1.22
Secondary amine _____meq./g__2.19
Tertiary amine _____meq./g__1.57

Example V.—Alkoxylation of aminomethylstearylamine (ethoxylated aminomethylstearylamine (15 mole adduct))

A one-liter Parr autoclave is charged with 227.0 gms. (0.76 mole) of aminomethylstearylamine and 1.5 gms. NaOH pellets. The temperature is raised to 150° C. and ethylene oxide (503 gms., 11.4 moles) is added slowly with stirring. The reaction mixture is maintained at 150–165° C./0–100 p.s.i.g. during the addition. The reaction is complete in 2.5 hours and the product is cooled. The product is isolated from the mixture as a viscous orange liquid.

*Analysis:*

Neutralization equiv. _____ 460
Primary amine _____ Nil
Secondary amine _____meq./g__0.08
Tertiary amine _____meq./g__2.17
Glycol _____percent__ 5.0

Example VI.—Alkoxylation of aminomethylstearylamine (ethoxylated aminomethylstearylamine (100 mole adduct))

The ethoxylated aminomethylstearylamine of Example V is treated with additional ethylene oxide at 150–165° C./0–80 p.s.i.g. to bring the total ethylene oxide content up to 100 moles. The product is a solid.

*Analysis:*

Neutralization equiv. _____2346
Glycol _____percent__ 5.6

Example VII.—Alkoxylation of aminomethylstearylamine (ethoxylated aminomethylstearylamine (200 mole adduct))

In like manner, the product of Example VI is treated with ethylene oxide to increase the ethylene oxide content to 200 moles.

*Analysis.*—Neutralization equiv., 3203.

Example VIII.—Alkoxylation of aminomethylstearylamine (ethoxylated aminomethylstearylamine (400 mole adduct))

In like manner, the 200 mole adduct of Example VII is treated with sufficient ethylene oxide to increase the ethylene oxide content to 400 moles. The product is a dark solid resembling carbowax.

Among the cyanofattynitriles that may be hydrogenated in accordance with the method of this invention, those falling within the following formula are operable:

Formula I

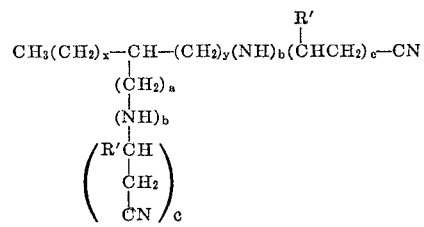

where $a=1$ to 2
$b=0$ when $a=0$ and 0 to 1 when $a=1$ to 2
$c=0$ when $b=0$ and 1 when $b=1$
R'=a radical selected from the group consisting of H— and $CH_3$—
$x+y=6$ to 22

Such compounds would include cyanocapronitrile, cyanoundecylnitrile, cyanolauronitrile, cyanomyristonitrile, cyanopalmitonitrile, cyanostearonitrile, N,N'-di-(β-cyanoethyl)aminomethylcaprylamine, N,N' - di-(β-cyanoethyl)aminomethylundecylamine, N,N' - di - (β - cyanoethyl)aminomethylpalmitylamine, N,N' - di - (β - cyanoethyl)aminomethylstearylamine, and the like. Indeed, any of the compounds disclosed in copending applications, Ser. No. 398,378, filed Sept. 22, 1964, now abandoned and the dicyanoethylalkylfattydiamines of Ser. No. 398,438, filed Sept. 22, 1964, now U.S. Patent No. 3,364,248 may be used as the cyanofattynitrile reactant.

Any hydrogenation catalyst may be used to convert the cyanonitrile to the diamine. Typical catalysts are nickel (especially Raney nickel), platinum, palladium, copper chromite or zinc, and oxides of zinc, nickel, copper, chromium and molybdenum. Concentrations of .05 to 15% of the nitrile can be used. Pressure can range from 15 p.s.i.g. to 3000 p.s.i.g. and temperature from 25° to 300° C.

If it is desired to alkylate the polyamine formed to its alkyl derivative, it is subsequently reacted with the appropriate alkylating agent, such as formaldehyde (one to four molar equivalents and preferably in excess of the polyamine), under alkylating pressure (50 to 500 p.s.i.g.) and temperature conditions (75 to 300° C.) in the presence of hydrogen and a hydrogenation catalyst (as above) under acid conditions, such as glacial acetic acid. Venting to remove water, as formed, is also performed.

If it is desired to alkoxylate the polyamine formed to the alkoxy derivative, it is subjected, under pressure (3 to 300 p.s.i.g.) and temperature (50 to 300° C.) and under alkaline conditions to an appropriate alkylene oxide, such as ethylene oxide, propylene oxide and the like in accordance with the amount of alkoxy groups one desires to add to the polyamine. From 2 to 200 moles and more may be added to each amine group. Catalyst concentration ranges between 1.0 to 15.0% of the fatty acid utilized, and the preferred concentration is 10.0% by weight.

The fatty polyamines, their alkyl and alkoxy derivatives that are formed by the methods of this invention are those which fall within the following formula:

Formula II $$CH_3(CH_2)_x-CH-(CH_2)_y(N''R)_b\left(\begin{matrix}R'\\|\\CH_2CH_2\end{matrix}\right)_cNR_2$$
$$|$$
$$(CH_2)_a$$
$$|$$
$$(N'''R)_b$$
$$\left(\begin{matrix}R'CH\\|\\CH_2\\|\\CH_2\end{matrix}\right)_o$$
$$|$$
$$N'R_2$$

where

R is a radical selected from the group consisting of $CH_3-$, $H(OCH_2CH_2)_e-$, $$H(OCHCH_2)_e-$$
$$|$$
$$CH_3$$

and mixtures thereof where $e=2$ to 200
R' is a radical selected from the group consisting of H— and $CH_3-$
$a=1$ to 2
$b=0$ to 1
$c=0$ when $b=0$ and 1 when $b=1$
$x+y=7$ to 23 when $b=0$, 6 to 22 when $b=1$ Among the straight fatty polyamines which fall within the above formula are aminomethylcaprylylamine, aminomethylcaprylamine, aminomethyllaurylamine, aminomethylmyristylamine, aminomethylpalmitylamine, aminomethylstearylamine, aminomethylarachidylamine, aminomethylbehenylamine, aminomethyllignocerylamine, aminoethylcaprylylamine, aminoethylcaprylamine, aminoethyllaurylamine, aminoethylmyristylamine, aminoethylpalmitylamine, aminoethylstearylamine, aminoethylarachidylamine, aminoethylbehenylamine, aminoethyllignocerylamine, N''',N'' - di-(3-aminopropyl)aminomethylcaprlylamine, N''',N'' - di - (3-aminopropyl)aminomethylcaprylamine, N''',N''-di-(3-aminopropyl)aminomethyllaurylamine, N''',N'' - di-(3-aminopropyl)aminomethylmyristylamine, N''',N''-di-(3-aminopropyl)aminomethylpalmitylamine, N''',N''-di-(3-aminopropyl)aminomethylstearylamine, N''',N''-di-(3-aminopropyl)aminomethylarachidylamine, N''',N''-di-(3-aminopropyl)aminomethylbehenylamine, N''',N''-di-(3-aminopropyl)aminomethyllignocerylamine, N''',N'' - di - (3-aminopropyl)aminoethylcaprylylamine, N''',N'' - di - (3 - aminopropyl)aminoethylcaprylamine, N''',N''-di-(3-aminopropyl)aminoethyllaurylamine, N''',N'' - di - (3 - aminopropyl)aminoethylmyristylamine, N''',N'' - di - (3 - aminopropyl)aminoethylpalmitylamine, N''',N'' - di - (3 - aminopropyl)aminoethylstearylamine, N''',N'' - di - (3-aminopropyl)aminoethylarachidylamine, N''',N'' - di - (3 - aminopropyl)aminoethylbehenylamine, N''',N'' - di - (3-aminopropyl)aminoethyllignocerylamine, or mixtures thereof such as derivable from natural fats and oils such as tallow, soybean oil and coconut oil.

Among the alkylated aminofattyamines which fall within the above formula are N,N,N',N'-tetramethylaminomethylcaprylylamine, N,N,N',N' - tetramethylaminomethylcaprylamine, N,N,N',N'-tetramethylaminomethyllaurylamine, N,N,N',N' - tetramethylaminomethylmyristylamine, N,N,N',N'-tetramethylaminomethylpalmitylamine, N,N,N',N'-tetramethylaminomethylarachidylamine, N,N,N',N'-tetramethylaminomethylstearylamine, N,N,N',N' - tetramethylaminomethylbehenylamine, N,N,N',N'-tetramethylaminomethyllignocerylamine, N,N,N',N'-tetramethylaminoethylcaprylylamine, N,N,N',N' - tetramethylaminoethylcaprylamine, N,N,N',N'-tetramethylaminoethyllaurylamine, N,N,N',N'-tetramethylaminoethylmyristylamine, N,N,N',N'-tetramethylaminoethylpalmitylamine, N,N,N',N' - tetramethylaminoethylstearylamine, N,N,N',N' - tetramethylaminoethylarachidylamine, N,N,N',N'-tetramethylaminoethylbehenylamine, N,N,N',N'-tetramethylaminoethyllignocerylamine, and N,N,N',N',N'',N''' - hexamethyl - N''', N'' - di - (3 - aminopropyl)aminomethylcaprylylamine, N,N,N',N',N'',N''',N''''-hexamethyl-N''',N'' - di - (3 - aminopropyl)aminomethylcaprylamine, N,N,N',N',N'',N'''-hexamethyl-N''',N'' - di - (3-aminopropyl)aminomethyllaurylamine, N,N,N',N',N'',N'''-hexamethyl-N''',N''-di-(3-aminopropyl)aminomethylmyristylamine, N,N,N',N',N'',N'''-hexamethyl-N''',N'' - di - (3-aminopropyl)aminomethylpalmitylamine, N,N,N',N',N'',N''' - hexamethyl-N''',N''-di-(3-aminopropyl)aminomethylstearylamine, N,N,N',N',N'',N'''-hexamethyl - N''',N''-di-(3-aminopropyl)aminomethylarachidylamine, N,N,N',N',N'',N''' - hexamethyl - N''',N'' - di - (3 - aminopropyl)aminomethylbehenylamine, N,N,N',N',N'',N''' - hexamethyl - N''',N'', - di - (3 - aminopropyl)aminomethyllignocerylamine, N,N,N',N',N'',N''' - hexamethyl - N''',N'' - di - (3 - aminopropyl)aminoethylcaprylylamine, N,N,N',N',N'',N''' - hexamethyl - N''',N'' - di - (3 - aminopropyl)aminoethylcaprylamine, N,N,N',N',N'',N''' - hexamethyl - N''',N'' - di - (3 - aminopropyl)aminoethyllaurylamine, N,N,N',N',N'', N''' - hexamethyl - N''',N'' - di - (3 - aminopropyl)aminoethylmyristylamine, N,N,N',N',N'',N''' - hexamethyl-N''', N'' - di - (3 - aminopropyl)aminoethylpalmitylamine, N,N,N',N',N'',N''' - hexamethyl - N''',N'' - di - (3 - aminopropyl)aminoethylstearylamine, N,N,N',N',N'',N'''-hexamethyl - N''',N'' - di - (3 - aminopropyl)aminoethylarachidylamine, N,N,N',N',N'',N''' - hexamethyl - N''',N'' - di - (3 - aminopropyl)aminoethylbehenylamine, N,N,N',N',N'',N''' - hexamethyl - N''',N'' - di - (3 - aminopropyl)aminoethyllignocerylamine, or mixtures thereof such as derivable from natural fats and oils such as tallow, soybean oil and coconut oil.

Among the alkoxylated aminofattyamines which fall within the above formula are the ethoxylated and propxylated aminomethylcaprylylamine, aminoethylcaprylamine, aminomethyllaurylamine, aminomethylmyristylamine, aminomethylpalmithylamine, aminomethylstearylamine, aminomethylarachidylamine, aminomethylbehenylamine, aminomethyllignocerylamine, aminoethylcaprylylamine, aminoethylcaprylamine, aminoethyllaurylamine, aminoethylmyristylamine, aminoethylpalmitylamine, aminoethylstearylamine, aminoethylarachidylamine, aminoethylbehenylamine, aminoethyllignocerylamine, N''',N''-di - (3 - aminopropyl)aminomethylcaprylylamine, N''', N'' - di - (3 - aminopropyl)aminomethylcaprylamine, N''', N'' - di - (3 - aminopropyl)aminomethyllaurylamine, N''', N'' - di - (3 - aminopropyl)aminomethylmyristylamine, N''',N''-di-(3 - aminopropyl)aminomethylpalmitylamine, N''',N'' - di - (3 - aminopropyl)aminomethylstearylamine, N''',N''-di-(3 - aminopropyl)aminomethylarachidylamine, N''',N'' - di - (3-aminopropyl)aminomethylbehenylamine, N''',N'' - di - (3 - aminopropyl)aminomethyllignocerylamine, N''',N'' - di - (3-aminopropyl)aminoethylcaprylyl-amine, N''',N'' - di - (3 - aminopropyl)aminoethylcapryl-amine, N''',N'' - di - (3 - aminopropyl)aminoethyllauryl-amine, N''',N'' - di - (3-aminopropyl)aminoethylmyristyl-amine, N''',N'' - di - (3-aminopropyl)aminoethylpalmityl-amine, N''',N'' - di - (3 - aminopropyl)aminoethylstearyl-amine, N''',N'' - di - (3 - aminopropyl)aminoethylara-chidylamine, N''',N'' - di - (3 - aminopropyl)aminoethyl-behenylamine, N''',N''-di-(3-aminopropyl)aminoethyllig-nocerylamine, or mixtures thereof such as derivable from natural fats and oils such as tallow, soybean oil and coconut oil.

The aminoalkyl-and the N''',N''-di-(3-aminopropyl) aminoalkylfattyamines of this invention have surfactant properties and may be used as flotation agents especially for molybdenum, copper sulfide, silver and iron ore recovery or as asphalt emulsifiers. They are also good epoxy resin curing agents, when used in a concentration of 10 to 50% of the resin, as evidenced by the following tables:

TABLE I.—PROPERTIES OF CAST SHEET OF EPOXY RESIN CURED WITH AN AMINE CURING AGENT

| | Epon 828/ amine, wt. ratio | Cure | Solvent and Solution Stability, Percent Gain in Weight | | | | | | | | Physical Properties | | |
|---|---|---|---|---|---|---|---|---|---|---|---|---|---|
| | | | Toluene | MIBK* | Mineral Spirits | 10% Tide | 10% NaOH | 10% $H_2SO_4$ | De-ionized $H_2O$ | Shrinkage | Hardness Shore D 10 sec. | Dielectric Constant |
| Aminomethylstearyla-mine. | 70/30 | 300° F., 1.5 hr. | 8.30 | 3.03 | 0.19 | 0.42 | 0.23 | 0.92 | 0.28 | Slight | 73 | 2.93 |
| N''',N''-di-(3-amino-propyl)aminomethyl-stearylamine. | 70/30 | 300° F., 2 hr. | 1.54 | 0.41 | 0.03 | 0.52 | 0.28 | 3.22 | 0.35 | Nil | 76 | 3.10 |

*MIBK—Methyl Isobutyl Ketone.

TABLE II.—PROPERTIES OF A FILM COATING OF ANOTHER EPOXY RESIN CURED WITH AN AMINE CURING AGENT

| | Parts per Hundred of Epon 1001 Resin | Cure | Physical Properties | | | | | | | | | | | | |
|---|---|---|---|---|---|---|---|---|---|---|---|---|---|---|---|
| | | | Sward Hardness | | | | | | Impact | | | | | Flexibility | |
| | | | *1 | *2 | *3 | *4 | *5 | *6 | *1 | *2 | *3 | *4 | *6 | *10 | *5 | *10 |
| Aminomethylstearylamine | 16.15 | Room Temp | 20 | 22 | | | | | 160 | | 160 | | 160 | 160 | Pass ⅛ | Pass ⅛. |
| | | Baked | 60 | 62 | | | | | 160 | | | | 160 | 160 | do | Fail ⅛. |
| N''',N''-di-(3-aminopropyl)-aminomethylstearylamine. | 14.14 | Room Temp | 38 | | 36 | | | | | 160 | 160 | 160 | | | do | |
| | | Baked | 24 | | 26 | | | | | | | 160 | 160 | | do | |

*Weeks film has aged.

Other uses are:

plasticizer for protein resins (casein, gelatin, soybean),
polyurethane initiators,
epoxy curing agent,
pharmaceutical intermediate,
color stabilizer (alcohol-soluble chelating agent),
metal treating (not specified),
neutralizer for Carbopol (polyacrylic acid polymer), and
hyrophyllic emulsifying agent for use in "Wurlan" process for shrink-resistance of wool.

The alkylated derivatives of the above aminofatty-amines are good antistat agents.

The alkoxylated derivatives of the above aminofatty-amines are also good epoxy resin curing agents and, depending on the degree of alkoxylation, are good surfactants, such as in debonding of paper having rewet properties.

It will thus be seen that the objects set forth above, among those made apparent from the preceding description, are efficiently attained and, since certain changes may be made in carrying out the above method and in the compounds set forth without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed is:

1. The fatty polyamines and their alkyl and alkoxy derivatives falling within the formula:

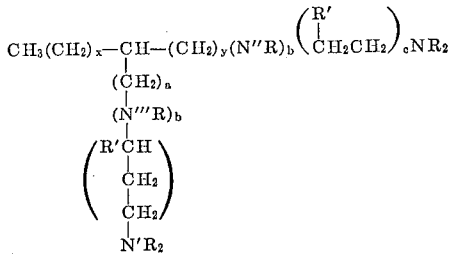

where

R is a radical selected from the group consisting of $CH_3-$, $H(OCH_2CH_2)_e-$,

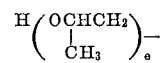

and where $e=2$ to 200

R is a radical selected from the group consisting of $H-$ and $CH_3-$
$a=1$ to 2
$b=0$ to 1
$c=0$ when $b=0$ and 1 when $b=1$
$x+y=7$ to 23 when $b=0$, 6 to 22 when $b=1$.

2. N,N,N',N'-tetramethylaminomethylstearylamine.
3. Bis-(2-hydroxyethyl)aminomethylstearylamine.
4. Eethoxylated aminomethylstearylamine.

References Cited

UNITED STATES PATENTS

| 2,121,509 | 6/1938 | Pyman et al. | 260—583 X |
| 2,166,152 | 7/1939 | Howk | 260—583 |
| 2,390,766 | 12/1945 | Zellhoefer et al. | 260—583 |
| 2,930,761 | 3/1960 | Charret | 260—584 X |

CHARLES B. PARKER, Primary Examiner.

R. L. RAYMOND, Assistant Examiner.

U.S. Cl. X.R.

252—351; 260—584

UNITED STATES PATENT OFFICE
CERTIFICATE OF CORRECTION

Patent No. 3,418,374                      December 24, 1968

Eugene J. Miller, Jr., et al.

It is certified that error appears in the above identified patent and that said Letters Patent are hereby corrected as shown below:

Column 4, lines 45 to 49, lower portion of the formula shou appear as shown below:

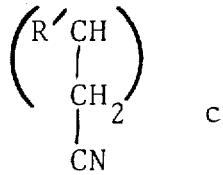

Column 5, lines 29 and 30, the right-hand portion of Formula II should appear as shown below:

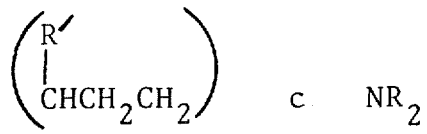

Column 8, lines 13 to 17, the lower left-hand portion of the formula should appear as shown below:

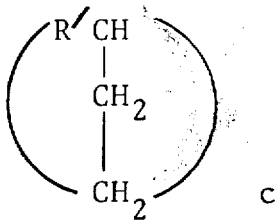

same column 8, line 47, after the second formula in Claim 1, insert -- and mixtures thereof --; line 49, "R" should read -- R′ --.

Signed and sealed this 23rd day of February 1971.

(SEAL)
Attest:

EDWARD M. FLETCHER. JR.               WILLIAM E. SCHUYLER, J
Attesting Officer                         Commissioner of Patent